United States Patent
Chen et al.

(10) Patent No.: US 8,421,793 B2
(45) Date of Patent: Apr. 16, 2013

(54) PIXEL ARRAY SUBSTRATE

(75) Inventors: Chien-Chou Chen, Hsin-Chu (TW);
Chun-Chang Chiu, Hsin-Chu (TW)

(73) Assignee: Au Optronics Corporation, Hsinchu (TW)

( * ) Notice: Subject to any disclaimer, the term of this patent is extended or adjusted under 35 U.S.C. 154(b) by 905 days.

(21) Appl. No.: 11/907,646

(22) Filed: Oct. 16, 2007

(65) Prior Publication Data

US 2008/0231583 A1     Sep. 25, 2008

(30) Foreign Application Priority Data

Mar. 21, 2007   (TW) ............................. 96109658 A

(51) Int. Cl.
*G09G 5/00* (2006.01)
*G09G 3/36* (2006.01)
*G06F 3/038* (2006.01)
*G02F 1/1343* (2006.01)
*G02F 1/1333* (2006.01)

(52) U.S. Cl.
USPC ................ 345/214; 345/98; 349/54; 349/55; 349/192

(58) Field of Classification Search .................... 345/98, 345/214; 349/54, 55, 192
See application file for complete search history.

(56) References Cited

U.S. PATENT DOCUMENTS

| | | | | |
|---|---|---|---|---|
| 7,098,989 | B2 * | 8/2006 | Wu | 349/192 |
| 7,515,243 | B2 * | 4/2009 | Watamura | 349/192 |
| 2001/0028429 | A1 * | 10/2001 | Wu | 349/139 |
| 2004/0212753 | A1 * | 10/2004 | Wu | 349/54 |
| 2006/0012728 | A1 * | 1/2006 | Watamura | 349/43 |
| 2007/0045625 | A1 * | 3/2007 | Chen et al. | 257/59 |
| 2007/0046848 | A1 * | 3/2007 | Jen et al. | 349/54 |
| 2007/0046849 | A1 * | 3/2007 | Lai et al. | 349/54 |
| 2007/0090357 | A1 * | 4/2007 | Tsou et al. | 257/57 |
| 2007/0222727 | A1 * | 9/2007 | Baek et al. | 345/87 |
| 2008/0231583 | A1 * | 9/2008 | Chen et al. | 345/98 |

* cited by examiner

*Primary Examiner* — William L Boddie
*Assistant Examiner* — Alecia D English
(74) *Attorney, Agent, or Firm* — Jianq Chyun IP Office

(57) ABSTRACT

This present invention discloses a pixel array substrate including a substrate, a plurality of scan lines, a plurality of data lines, a plurality of active elements, a plurality of pixel electrodes, a plurality of first patterned floating lines, and a plurality of first patterned connecting wires. A plurality of pixel fields are formed by the cross scan lines and data lines, and each active element is electrically connected with the corresponding scan line, data line and pixel electrode. Each first patterned floating line is overlapped with some data lines. Each first patterned connecting wire is disposed across some scan lines, and disposed overlapped the first patterned floating lines disposed on the two sides of the scan line.

34 Claims, 16 Drawing Sheets

PIXEL ARRAY SUBSTRATE

BACKGROUND OF THE INVENTION

1. Field of the Invention

This present invention relates to a semiconductor substrate and, more particularly, to a pixel array substrate.

2. Description of Related Art

With growth of the society, every type of display has been developed for using in the mobile phone, notebook computer, digital camera and personal digital assist. Further, both liquid crystal display (LCD) and organic light-emit diode (OLED) are popular for everyone due to some advantages of themselves such as small size, low weight, and power saving. During manufacturing period of liquid crystal display or organic light-emit diode, the pixel array substrate is essential for the semiconductor process. By adjusting every pixel color displayed on the pixel array substrate, the display device can generate the image relative to the adjusting step.

FIG. 1 is an upper view of a conventional pixel array substrate. Referring to FIG. 1, the conventional pixel array substrate 100 comprises a substrate (not shown in the figure), a plurality of scan lines 110 disposed on the substrate, a plurality of data lines 120, a plurality of thin film transistor 130, a plurality of pixel electrodes 140 and a repair line 150, wherein each of the scan lines 110 respectively crosses with the data lines 120 for defining a plurality of pixel field (not shown in figure), and the repair line 150 locates around the plurality of the pixel fields. Therefore, each of the scan lines 110 aligns in a row and each of the data line 120 arranges in a line, and every pixel field comprises the thin film transistor 130 and the pixel electrode 140.

The thin film transistor 130, located near the intersection of the scan line 110 and the data line 120, electrically connects to the scan line 110, the data line 120 and the pixel electrode 140. In addition, the thin film transistor 130 receives the scan signal transmitted by the scan line 110 to determine a power-on/power-off status. While the thin film transistor 130 maintains the power-on status, the pixel electrode 140 can receive the data signal transmitted by the data line 120 through the thin film transistor 130 for adjusting the color of pixel.

During manufacturing process of the pixel array substrate 100, when one of the date lines 120 is broken 122, two ends of the broken data line 120 can be welded to the repair line 150 by using laser welding for forming two welding portions 124, and therefore, a signal can be transmitted through the repair line 150. Because the repair line 150 is too long, the conventional pixel array substrate may cause an RC delay. In addition, a repair line 150 only can repair a broken data line 120, thus if the quantity of the broken data lines 120 exceeds the number of the repair lines, the pixel array substrate 100 cannot be repaired.

FIG. 2A is an upper view of another conventional pixel array substrate. FIG. 2B is a cross-sectional view of pixel array substrate of FIG. 2A in the direction AA'. Referring to FIGS. 2A and 2B, the conventional pixel array substrate 200 comprises a substrate 210, a plurality of scan lines 220 disposed on the substrate 210, a plurality of data lines 230, a plurality of thin film transistor 240, a plurality of pixel electrodes 250 and a plurality of patterned floating lines 260, wherein each of the patterned floating lines 260 is disposed under the plurality of data lines 230 and overlapped with some data lines 230. In addition, a first insulation layer 10 is disposed between the patterned floating lines 260 and the data lines 230; a second insulation layer 20 is disposed above the data lines 230; a semiconductor layer 50 is disposed above the gate (not marked) of the thin film transistor 240.

FIG. 2C is a schematic view according to FIG. 2A, wherein the data line of the pixel array substrate is broken. FIG. 2D is a cross-sectional view of the arrangement according FIG. 2A in the direction AA', wherein the data line 230 of the pixel array substrate is broken. Referring to FIGS. 2C and 2D, when the data line 230 is broken 232, two ends of the broken data line 230 can be welded to the patterned floating line 260 by using laser welding process for forming two welding portions 234 so as to repair the broken circuit of the data line 230.

Because the patterned floating line 260 and the scan line 220 are disposed in the same layer, the patterned floating line 260 cannot be disposed on the intersection of the data line 230 and the scan line 220. When the data line 230 is broken in the intersection of the data line 230 and the scan line 220, this conventional pixel array substrate 200 is unable to repair the broken data line 230.

FIG. 2E is a schematic view according to FIG. 2A, wherein the thin film transistor is broken. FIG. 2F is a cross-sectional view of the arrangement according FIG. 2E in the direction ZZ'. Referring to FIG. 2E and FIG. 2F, when the thin film transistor 240a is broken, for example, short circuit occurs between the gate 242a, the source 244a, and the drain 246a. Generally, by using laser cutting process to disconnect a wire connected with the drain 246a and the pixel electrode 250 can repair the pixel to become dark state.

In general, two adjacent pixel fields of the pixel array substrate 200 may substantially display the same color. When the pixel field relative to the thin film transistor 240 is in the dark state, the pixel field adjacent to the thin film transistor 240 is still in a normal display state. Accordingly, the user can be easy to discover the dead point of the pixel array substrate 200 and thus the display quality of display device is decreased.

FIG. 2G is a schematic view of another conventional pixel array substrate, wherein the data line 230 of the conventional pixel array substrate 200a is broken 232. Referring to FIG. 2G, the pixel array substrate 200a of FIG. 2G is similar to the pixel array substrate 200 of FIG. 2C, wherein the pixel array substrate 200a further comprises two light-shielding layers 260a disposed on the two sides of the data line 230, and the data line 230 further comprises a plurality of protruding portions 236 partially overlapped with light-shielding layers 260a.

When the data line 230 is broken 232, the protruding portion 236 disposed on the two ends of the broken data line 232 can be welded to the light-shielding layer 260 by using laser welding process for forming a plurality of welding portions 234a capable of repairing the broken data line 230. Because both of the light-shielding layer 260a and the scan line 220 are disposed at the same layer, the light-shielding layer 260a cannot be disposed at the intersection of the data line 230 and the scan line 220. When the data line 230 is broken 232 in the intersection of the scan line 220 and the data line 230, this conventional pixel array substrate 200a cannot be repaired.

FIG. 2H is a schematic view of another conventional pixel array substrate 200b, wherein the data line 230 is broken 232. Referring to FIG. 2H, the pixel array substrate 200b of FIG. 2H is similar to the pixel array substrate 200 of FIG. 2C, wherein the pixel electrode 250b of the pixel array substrate 200b is partially overlapped with the data line 230. When the data line 230 is broken 232, the broken data line 232 can be welded to the pixel electrode 250b for forming two welding portions 234b capable of repairing the broken circuit status.

In summary, the dead point also can be found on the pixel array substrate by using the aforementioned method, and it's still not a better method to resolve the aforementioned question.

SUMMARY OF THE INVENTION

An object of the present invention is to provide a pixel array substrate for repairing the broken data line.

The other object of the present invention is to provide a pixel array substrate for repairing the broken pixel field capable of displaying the same color with the adjacent pixel field.

For achieving the object, this present invention provides a pixel array substrate comprising: a substrate; a plurality of scan lines parallelly disposed on the substrate; a plurality of first patterned floating lines disposed on the substrate and located between the scan lines; an insulation layer disposed on the substrate for covering the scan lines and the first patterned floating lines; a plurality of data lines parallelly disposed on the insulation layer, wherein each data line crosses the scan lines and is partially overlapped with at least one of the first patterned floating lines, and each of the data lines is unable to electrically connect to the first patterned floating lines respectively; a plurality of active elements formed on the substrate and electrically connected to the corresponding scan lines and the data lines; a plurality of pixel electrodes formed on the substrate, wherein each of the pixel electrodes is electrically connected to the corresponding active element respectively; and a plurality of first patterned connecting wires, wherein each of the first patterned connecting wires crosses one of the scan lines and is partially overlapped with the first patterned floating lines disposed on the two sides of the scan line respectively.

The pixel array substrate further comprises a plurality of contact windows disposed on the substrate, wherein the first patterned floating lines are electrically connected to the first patterned connecting wire through the contact windows respectively.

Each active element comprises a drain, and each of the first patterned floating lines comprises a first protruding portion and a second protruding portion, wherein each first protruding portion is partially overlapped with each corresponding drain respectively, and each second protruding portion is partially overlapped with each corresponding pixel electrode respectively.

The pixel array substrate further comprises a plurality of second patterned floating lines disposed on the substrate, and each of the second patterned floating lines is partially overlapped with each corresponding scan line. In addition, each of the first patterned connecting wires crosses one of the data lines and is partially overlapped with the second patterned floating lines disposed on the two sides of the data line respectively. Further, the pixel array substrate further comprises a plurality of contact windows disposed on the substrate, wherein the second patterned floating lines are electrically connected to the first patterned floating lines through the contact windows respectively.

The pixel array substrate further comprises a plurality of second patterned floating lines disposed on the substrate, and each second patterned floating line is partially overlapped with each corresponding scan line. In addition, the pixel array substrate further comprises a plurality of second patterned connecting wires disposed on the substrate, wherein each of the second patterned connecting wires crosses each corresponding data line and is partially overlapped with the second patterned floating lines disposed on the two sides of the data line respectively. Each contact window is electrically connected to each corresponding second patterned floating line and each corresponding second patterned connecting wire, wherein each second patterned floating line is partially overlapped with each corresponding first patterned connecting wire.

The pixel array substrate further comprises a plurality of common lines disposed on the substrate and a plurality of third patterned connecting wires, wherein the common lines are relatively parallel to the scan lines and cross the data lines. Each of the third patterned connecting wires crosses each corresponding common line and is partially overlapped with the first patterned floating lines disposed on the two sides of the data line respectively. In addition, the pixel array substrate further comprises a plurality of contact windows disposed on the substrate, wherein the first patterned floating lines are electrically connected to the third patterned floating lines through the contact windows respectively.

This present invention provides another pixel array substrate comprising: a substrate; a plurality of scan lines disposed on the substrate; an insulation layer disposed on the substrate and the scan lines; a plurality of data lines disposed on the insulation layer and overlapped with the scan lines; a plurality of second patterned floating lines disposed on the insulation layer and partially overlapped with the scan lines; a plurality of active elements relatively electrically connected to the corresponding scan lines and data lines; a plurality of pixel electrodes relatively electrically connected to the corresponding active elements; and a plurality of second patterned connecting wires correspondingly crossing the data lines and overlapped with the second patterned floating lines disposed on the two sides of the data line.

The pixel array substrate further comprises a plurality of contact windows disposed on the substrate, wherein each of the second patterned floating lines is electrically connected to the second patterned connecting wires respectively through the contact windows.

Each of the scan lines is composed of aluminum, molybdenum, molybdenum nitride, titanium, titanium nitride, chromium, chromium nitride, or a combination thereof.

Each of the data lines is composed of aluminum, molybdenum, molybdenum nitride, titanium, titanium nitride, chromium, chromium nitride, or a combination thereof.

Other objects, advantages, and novel features of the invention will become more apparent from the following detailed description when taken in conjunction with the accompanying drawings.

DETAILED DESCRIPTION OF THE PREFERRED EMBODIMENT

The First Embodiment

Figure 1:
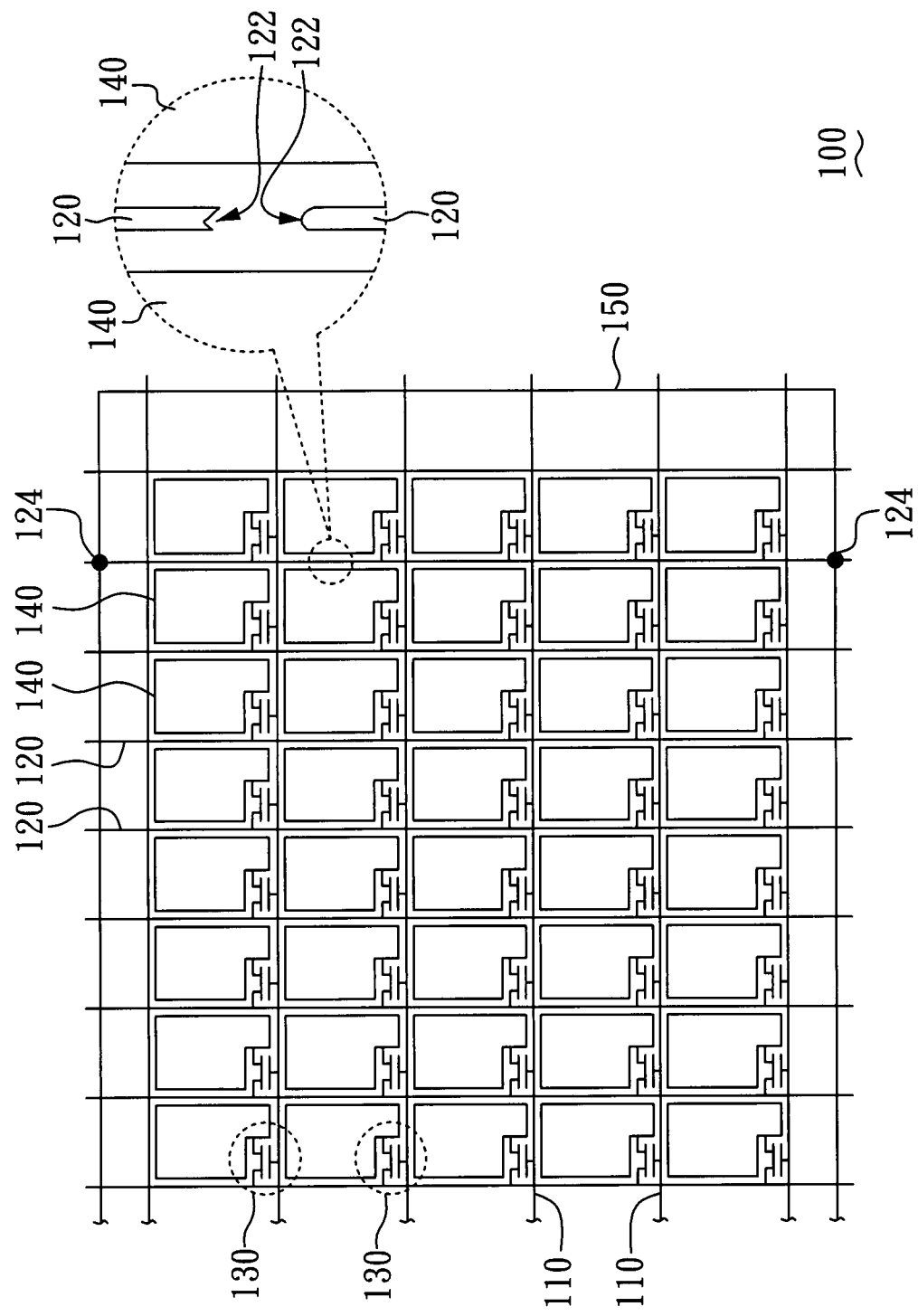
FIG. 1 is an upper view of a conventional pixel array substrate.
Figure 2A:
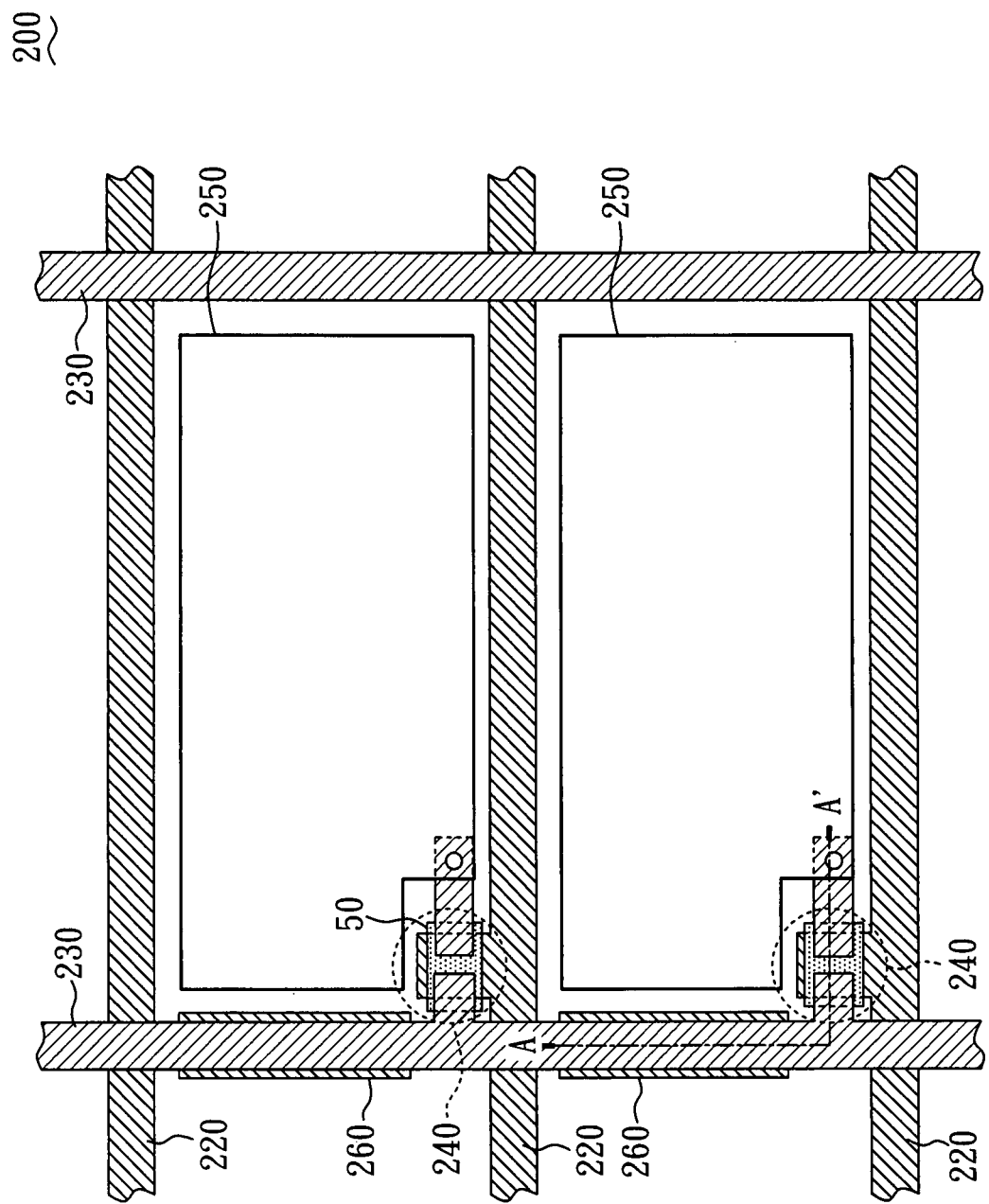
FIG. 2A is an upper view of another conventional pixel array substrate.
Figure 2B:
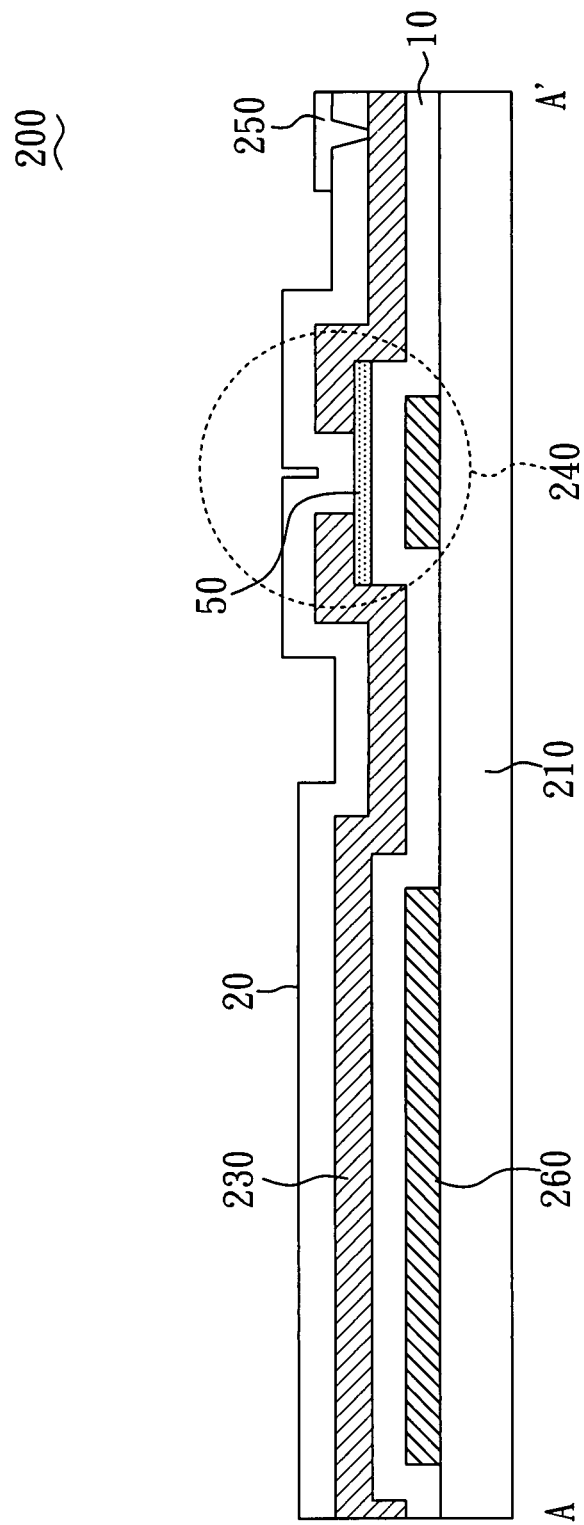
FIG. 2B is a cross-sectional view of pixel array substrate of FIG. 2A in the direction AA'.
Figure 2D:
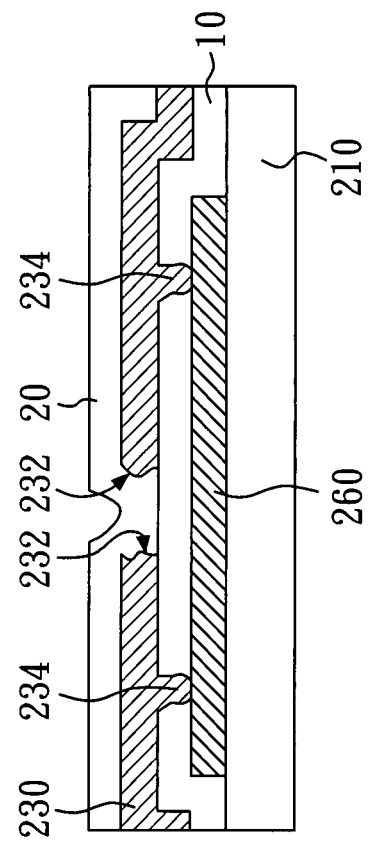
FIG. 2D is a cross-sectional view of the arrangement according FIG. 2A in the direction AA', wherein the data line of the pixel array substrate is broken.
Figure 2C:
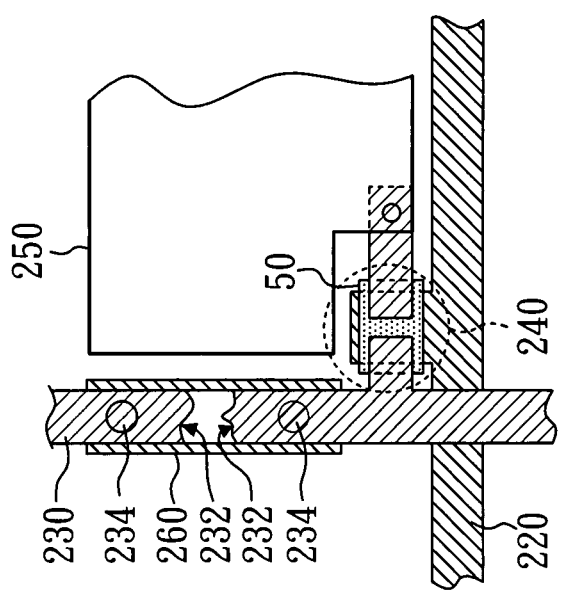
FIG. 2C is a schematic view according to FIG. 2A, wherein the data line of the pixel array substrate is broken.
Figure 2F:
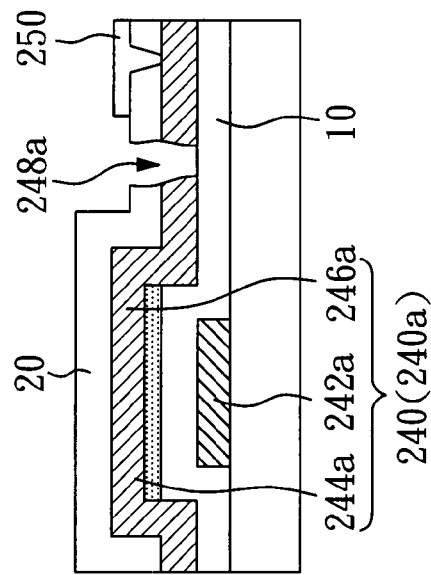
FIG. 2F is a cross-sectional view of the arrangement according FIG. 2E in the direction ZZ'.
Figure 2E:
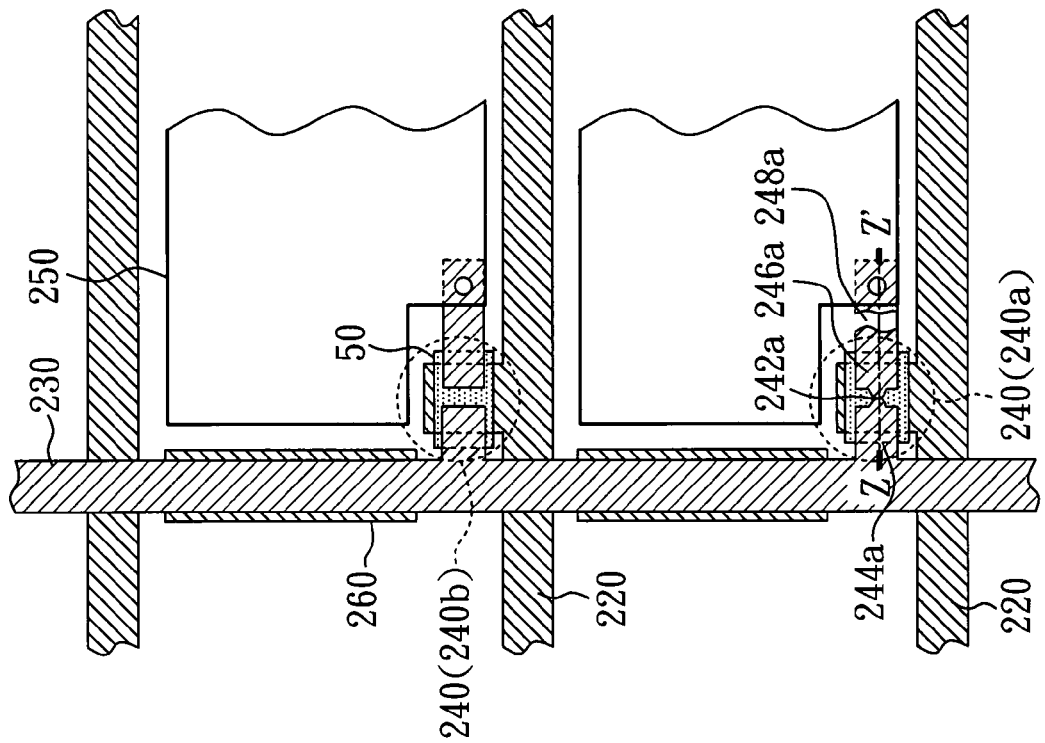
FIG. 2E is a schematic view according to FIG. 2A, wherein the thin film transistor is broken.
Figure 2G:
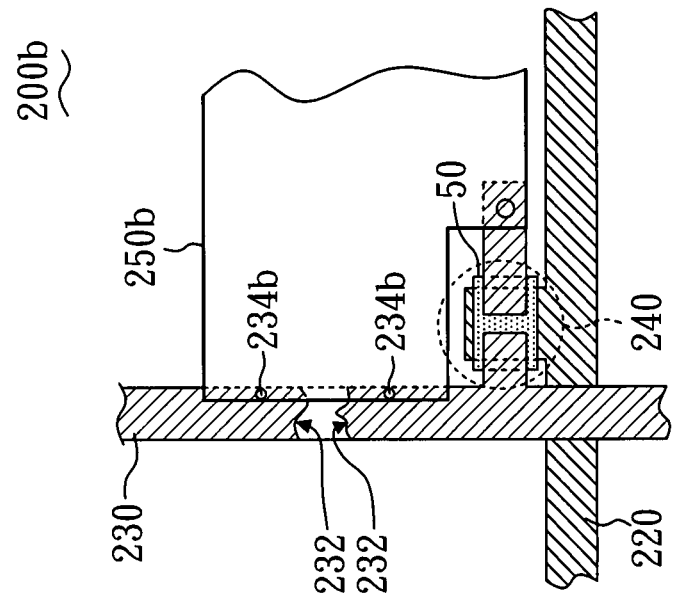
FIG. 2G is a schematic view of another conventional pixel array substrate, wherein the data line of the conventional pixel array substrate is broken.
Figure 2H:
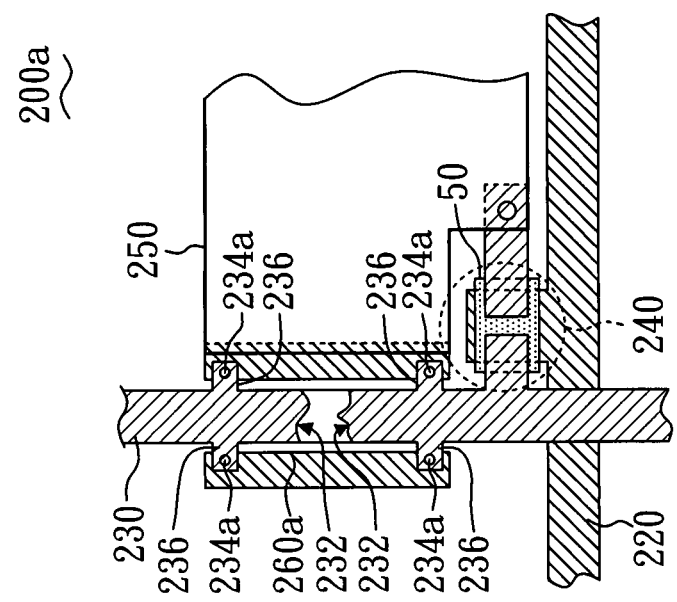
FIG. 2H is a schematic view of another conventional pixel array substrate, wherein the data line is broken.
Figure 3A:
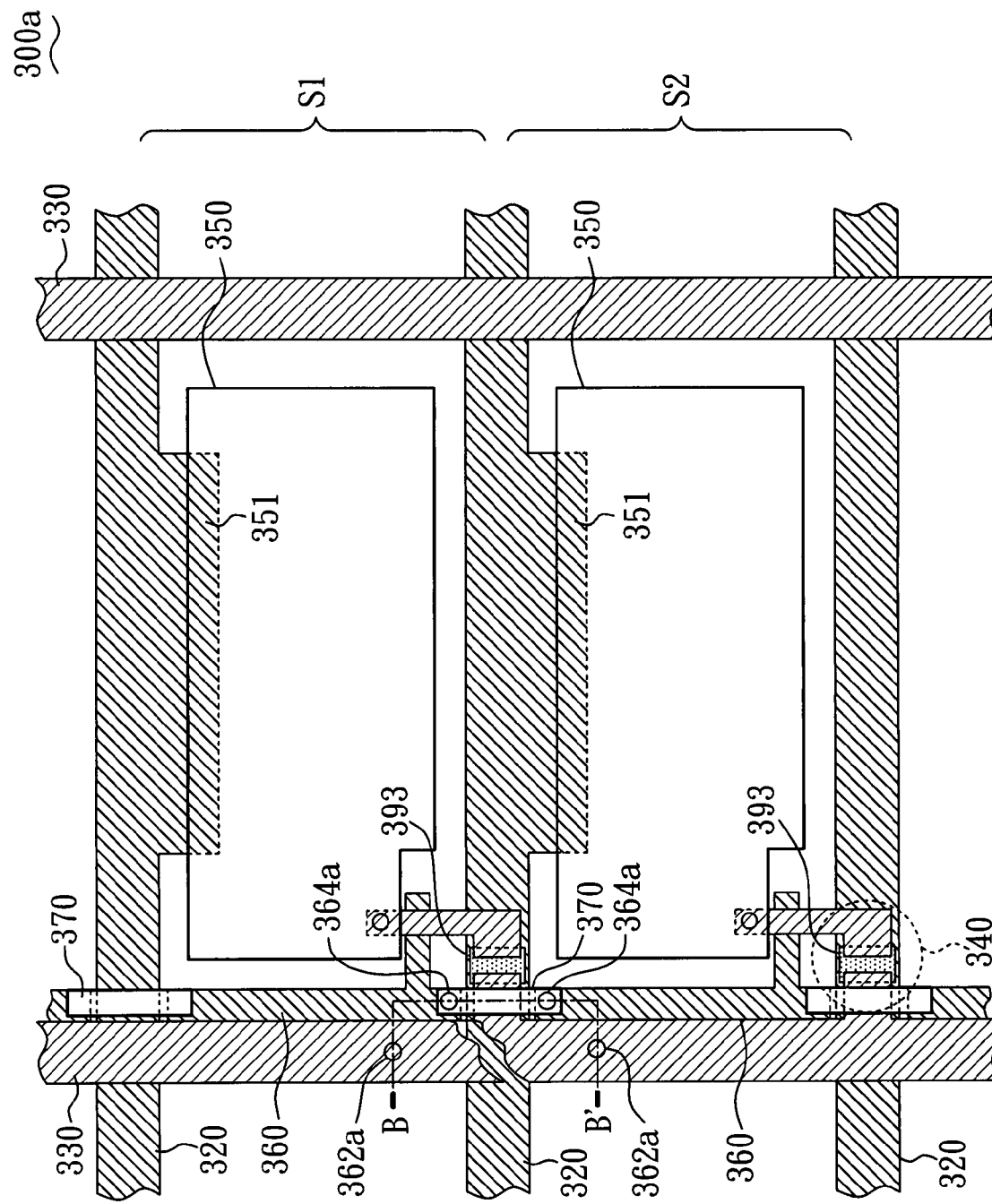
FIG. 3A is a schematic view of the pixel array substrate according to the first preferred embodiment of this present invention.
Figure 3B:
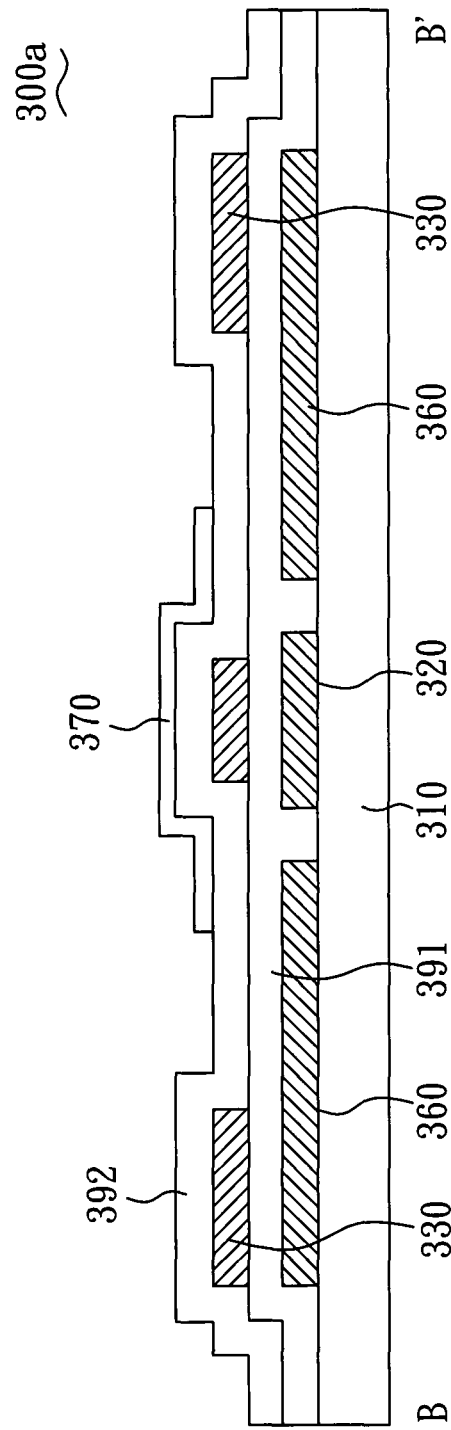
FIG. 3B is a cross-sectional view of the arrangement according FIG. 3A in the direction BB'.

FIG. 3A is a schematic view of the pixel array substrate according to the first preferred embodiment of this present invention. FIG. 3B is a cross-sectional view of the arrangement according FIG. 3A in the direction BB'. Referring to FIGS. 3A and 3B, the pixel array substrate 300a comprises a substrate 310, a plurality of scan lines 320 disposed on the substrate 310, a plurality of data lines 330, a plurality of active element 340, a plurality of pixel electrodes 350, a plurality of first patterned floating lines 360, and a plurality of first patterned connecting wires 370. In this embodiment, a first insulation layer 391 is located between the first patterned floating lines 360 and the data lines 330; a second insulation layer 392 is located above the data lines 330; a semiconductor layer 393 is disposed on the first insulation layer 391. The data lines 330 relatively cross the scan lines 320 for forming a plurality of pixel fields (as the pixel field S1, S2). Each pixel field respectively comprises an active element 340 and a pixel electrode 350, wherein the active element 350 is electrically connected to the scan line 320, data line 330 and pixel electrode 350. In this embodiment, part of the pixel electrode 350 is overlapped with each corresponding scan line 320 for forming an auxiliary capacitor 351. The floating lines 360 can comprise metal or other conductive materials.

Therefore, the active element 340 receives the scan signal transmitted by the scan line 320 to determine power on/off status. When the active element 340 is in the power on status, the pixel electrode 340 can receive the data signal transmitted via the data line 330 through the active element 340 for adjusting the color of pixel. Generally, the adjacent pixel fields (as the pixel field S1, S2) substantially display the same color.

In addition, each of the first patterned floating lines 360 is partially overlapped with each corresponding data line 330, and each of the first patterned connecting wires 370 crosses each corresponding scan line 320 and is partially overlapped with the first patterned floating lines 360 disposed on the two sides of the scan line 320. Generally, the first patterned floating lines 360 and the scan lines 320 may be disposed at the same layer for example, and the first patterned connecting wires 370 and the pixel electrodes 350 are disposed at the same layer. Each isolated first patterned floating line can be connected by using laser welding process for repairing the data line 330.

Figure 3C:
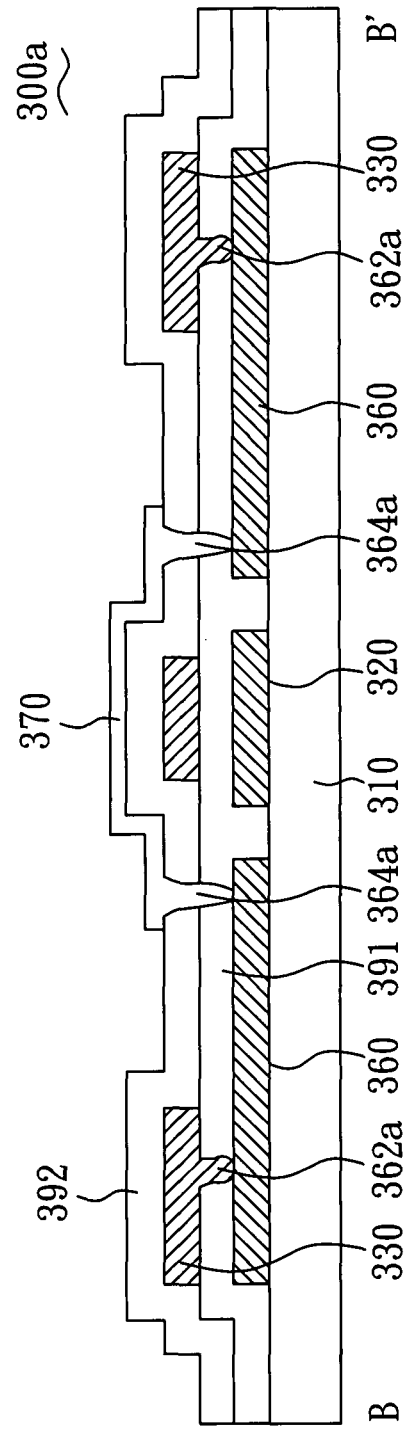
FIG. 3C is a cross sectional view according to FIG. 3A, wherein the data line is broken.

FIG. 3C is a cross sectional view according to FIG. 3A, wherein the data line 330 is broken. Referring to FIGS. 3A and 3C, when the date line 330 is broken at the intersection of the data line 330 and the scan line 320, the first patterned floating lines 360 disposed on two sides of the scan line 320 can be connected with the data line 330 by using laser welding process for repairing the broken data line 330. In this embodiment, by performing laser welding process, the broken data line 330 can be welded to the first patterned floating lines 360 for forming two welding portions 362a, and the first patterned connecting wires 370 can be welded to the first patterned floating line for forming two welding portions 364a, and therefore the broken data line 330 can be repaired through the connection of the first patterned floating line 360 and the first patterned connecting wire 370.

In this embodiment, the first patterned floating line 360 and the first patterned connecting wire 370 are shorter than the conventional repair line and the RC-delay can be prevented so thus the yield of the pixel array substrate 300a can be increased.

Each of the scan lines 320 and the data lines 330 are respectively composed of any kind of materials, preferably, but not limited to, such as aluminum, molybdenum, molybdenum nitride, titanium, titanium nitride, chromium, chromium nitride compound metal of above metal or multiple layer structure composed of the abovementioned metal. Each of the pixel electrodes is composed of transparent conduction material comprising Indium Tin Oxide or Indium Zinc Oxide.

The Second Embodiment

Figure 4:
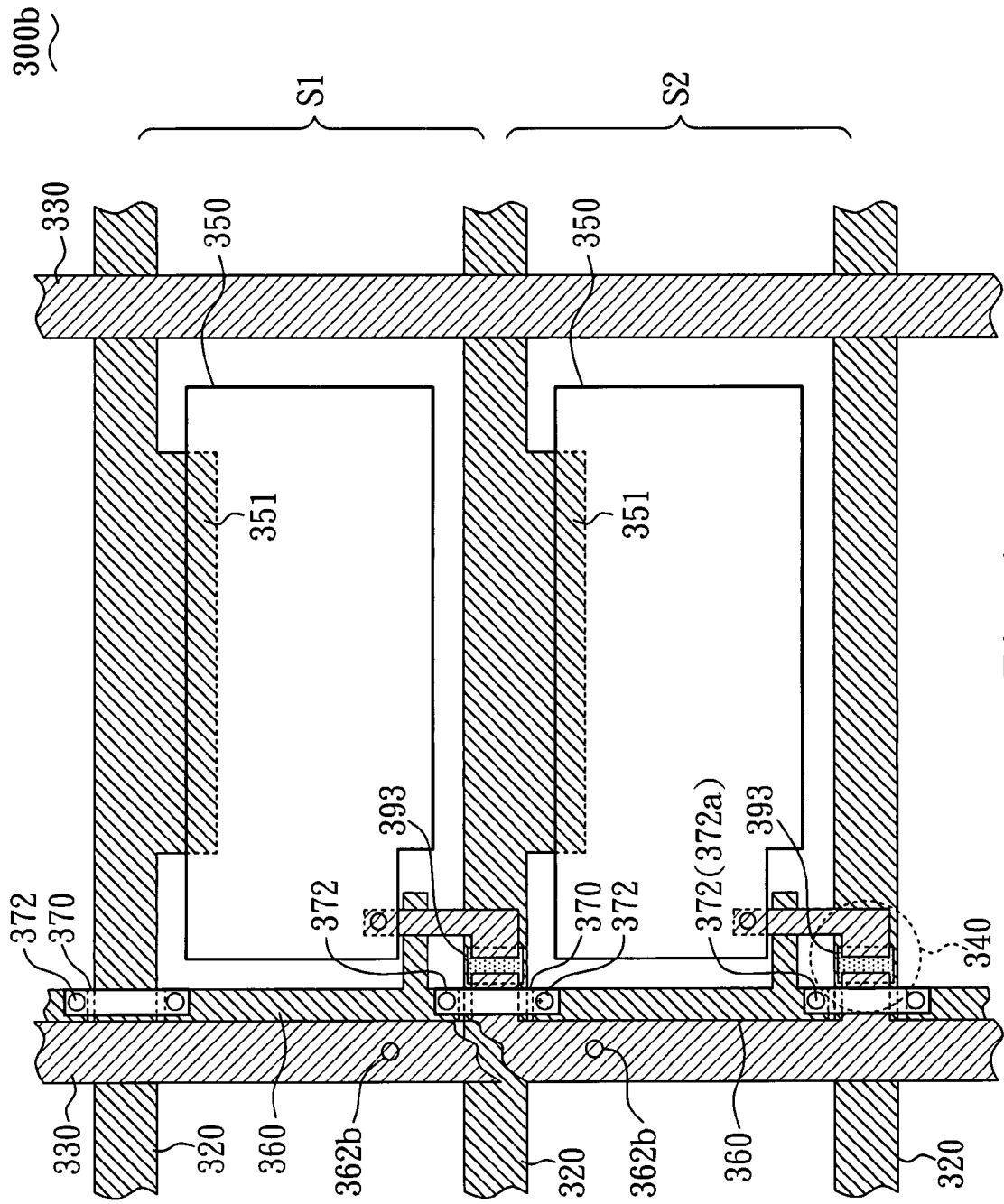
FIG. 4 is a schematic view of the pixel array substrate according to the second preferred embodiment of this present invention.

FIG. 4 is a schematic view of the pixel array substrate according to the second preferred embodiment of this present invention. Referring to FIG. 4, the pixel array substrate 300b is similar to the pixel array substrate 300a of FIG. 3A. In this embodiment, the pixel electrode 350 is partially overlapped with the scan line 320 for forming an auxiliary capacitor 351. The pixel array substrate 300b comprises a plurality of contact windows 372 disposed on the substrate 310, and each of the contact windows 372 is electrically connected to each corresponding first patterned floating line 360 and each corresponding first patterned connecting wire 370 respectively.

In this embodiment, when the date line 330 is broken at the intersection of the data line 330 and the scan line 320, the first patterned floating line 360 disposed on two sides of the scan line 320 can be connected with the data line 330 through laser welding process for forming two welding portions 362b so as to repair the broken data line 330. In addition, this present invention can cut the contact window 372a off to prevent the RC-delay.

Furthermore, in this present invention, the first patterned connecting wires 370 cross the scan line 320 and are electrically connected to the first patterned floating lines 360 respectively for repairing the data line 330. In this embodiment, the first patterned floating line 360 is electrically connected to the first patterned connecting wire 370 through the contact window 372 in the pixel array substrate 300b. In the first embodiment, when the data line 330 is broken, the first patterned floating line 360 is electrically connected to the first patterned connecting wire 370 after performing laser welding process for repairing the broken data line 330.

The Third Embodiment

Figure 5A:
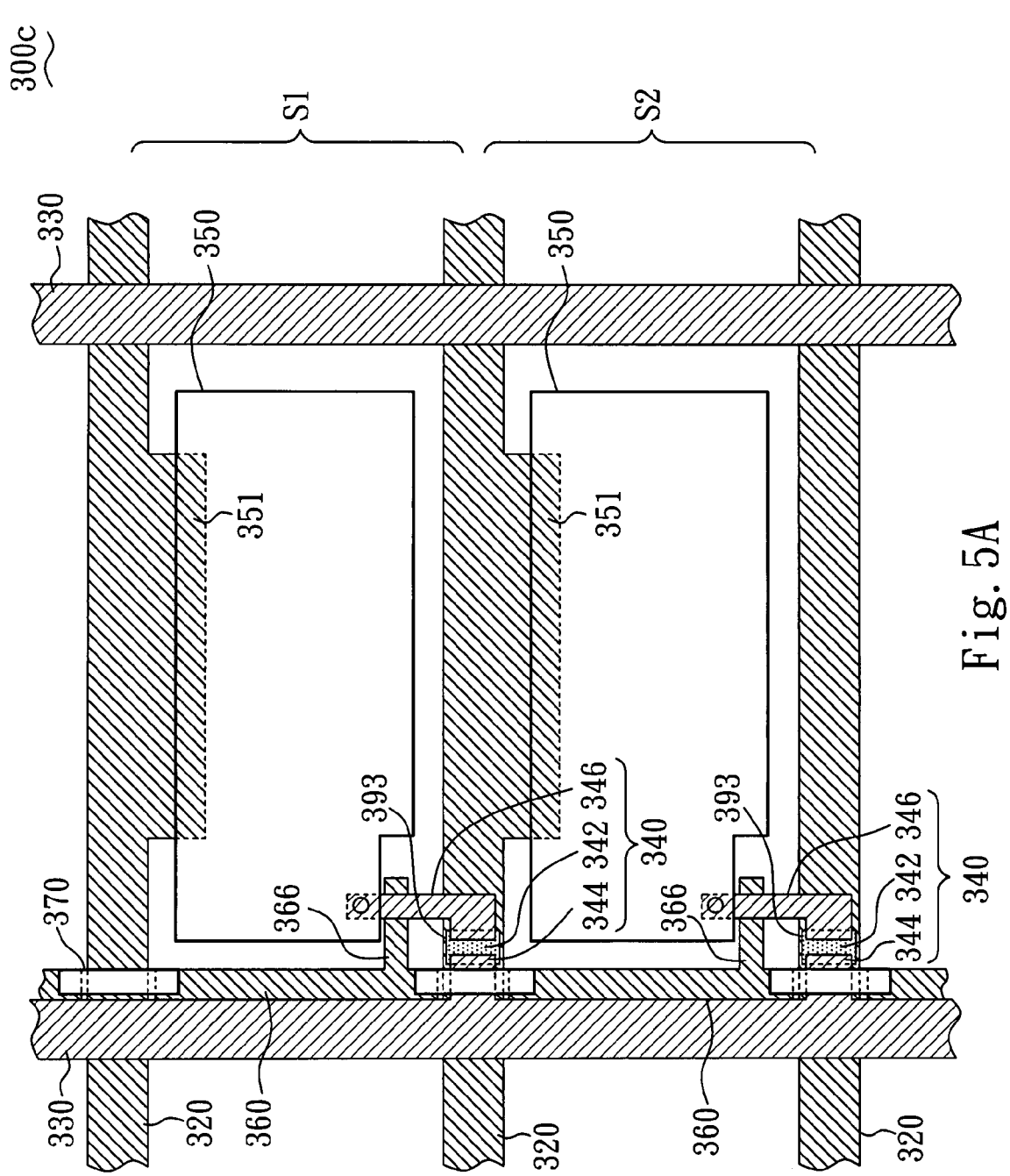
FIG. 5A is a schematic view of the pixel array substrate according to the third preferred embodiment of this present invention.

FIG. 5A is a schematic view of the pixel array substrate 300c according to the third preferred embodiment of this present invention. Referring to FIG. 5A, the pixel array substrate 300c is similar to the pixel array substrate 300a of FIG. 3A. In this embodiment, the first patterned floating line 360 further comprises a first protruding portion 366. In addition, the active element 340 is preferably a thin film transistor, wherein the gate 342 of the active element 340 is electrically connected to the scan line 320. In this embodiment, the gate 342 of the active element 340 is composed of some scan lines 320. The source 344 of the active element 340 is electrically connected to the data line 330, and the drain 346 of the active element 340 is electrically connected to the pixel electrode 350. In addition, the first protruding portion 366 is partially overlapped with the drain 346 of the active element 340.

Figure 5B:
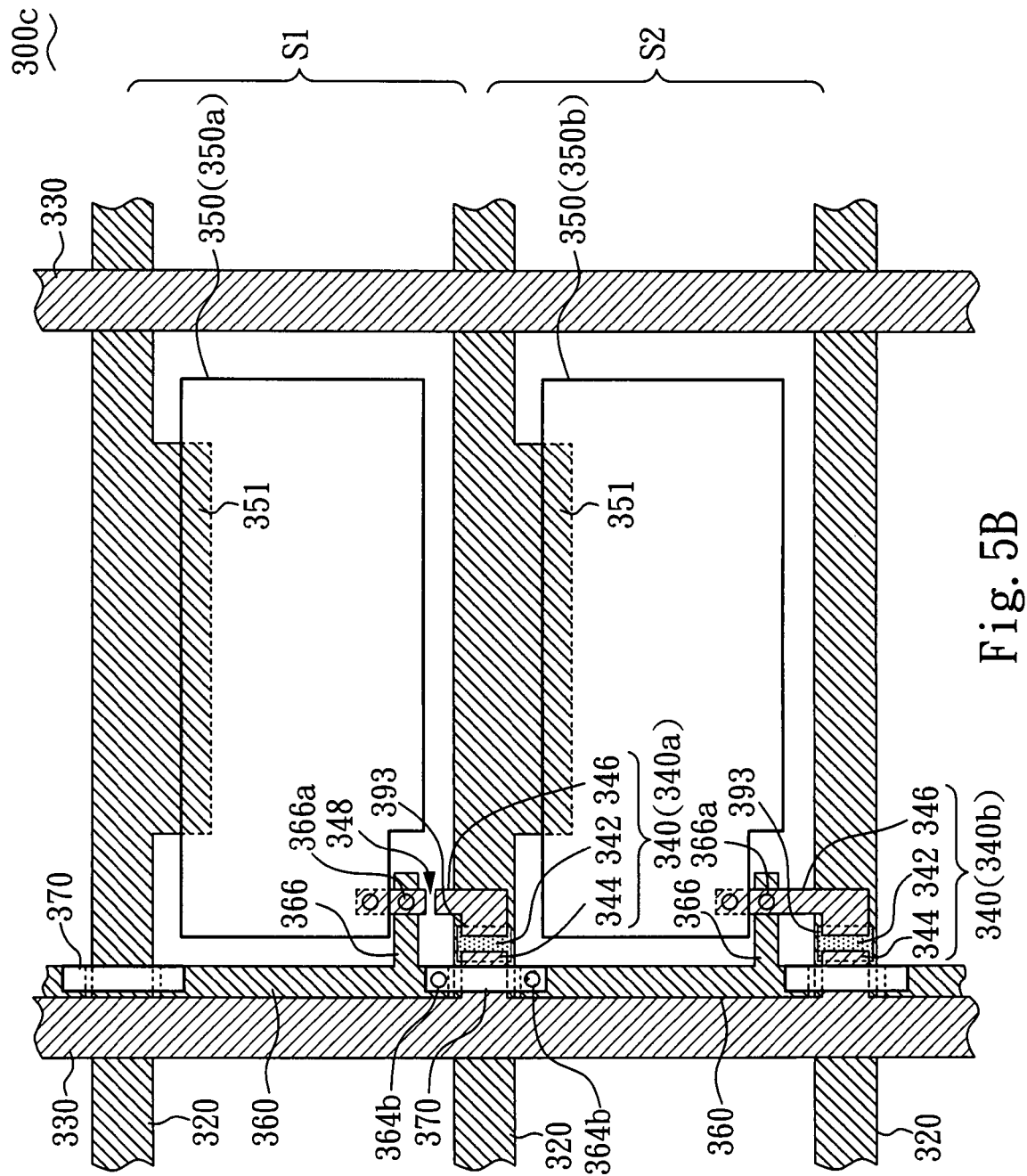
FIG. 5B is a schematic view according to FIG. 5A, wherein the active element is broken.

FIG. 5B is a schematic view according to FIG. 5A, wherein the active element is broken. Referring to FIGS. 5A and 5B, generally, in this embodiment, the adjacent pixel fields S1, S2 substantially display the same color, and thus when the active element 340a is broken, the pixel array substrate 300c can use the pixel field S1 to display the color of the pixel field S2. In this embodiment, since an open circuit 348 is formed by cutting off the drain 346 of the active element 340a, the pixel electrode 350a will not receive a wrong signal transmitted by the broken active element 340a. The first protruding portions 366 are respectively welded to the drain 346 of the active element 340a and the drain 346 of the active element 340b by using laser welding process for forming two welding portions 366a. Therefore, the first patterned connecting wire 370 can be welded to the first patterned floating lines 360 disposed on the two sides of scan line 320 by using laser welding process for forming two welding portions 364b so as to repair the broken pixel field S1.

When a data signal is transmitted to the pixel electrode 350b through the drain 346 of the active element 340b, the protruding portion 366 can also receive the data signal from the drain 346 of the active element 340b. Due to the connection between the first patterned connecting wire 370 and the first patterned floating line 360, the pixel electrode 350a can also receive the data signal. Therefore, by using the aforementioned method, this present invention can repair some circumstances as described below: a short circuit exists between the drain 346 and the source 344, or the active element 340a is broken. Basically, if the drain 346 of the active element 340a is cut off, the active element 340a will not control the pixel field S1. Consequently, the pixel electrode 350a of the pixel field S1 is electrically connected to the active element 340b of the pixel field S2, and the active element 340b can control the pixel field S1 and the pixel field S2 to display the same color simultaneously. Because two adjacent pixel field S1, S2 substantially display the same color, it cannot be easy to identify the broken pixel field S1.

Further, in this embodiment, two adjacent pixel fields are used to illustrate the repairing method of broken pixel field, but the present invention is not limited thereto, for example, two pixel fields spaced at some intervals can also be used. In addition, in this embodiment of this present invention, the contact window (second embodiment) can also be electrically connected to the first patterned connecting wire 370 and the first patterned floating line 360 to achieve the same object.

Figure 5C:
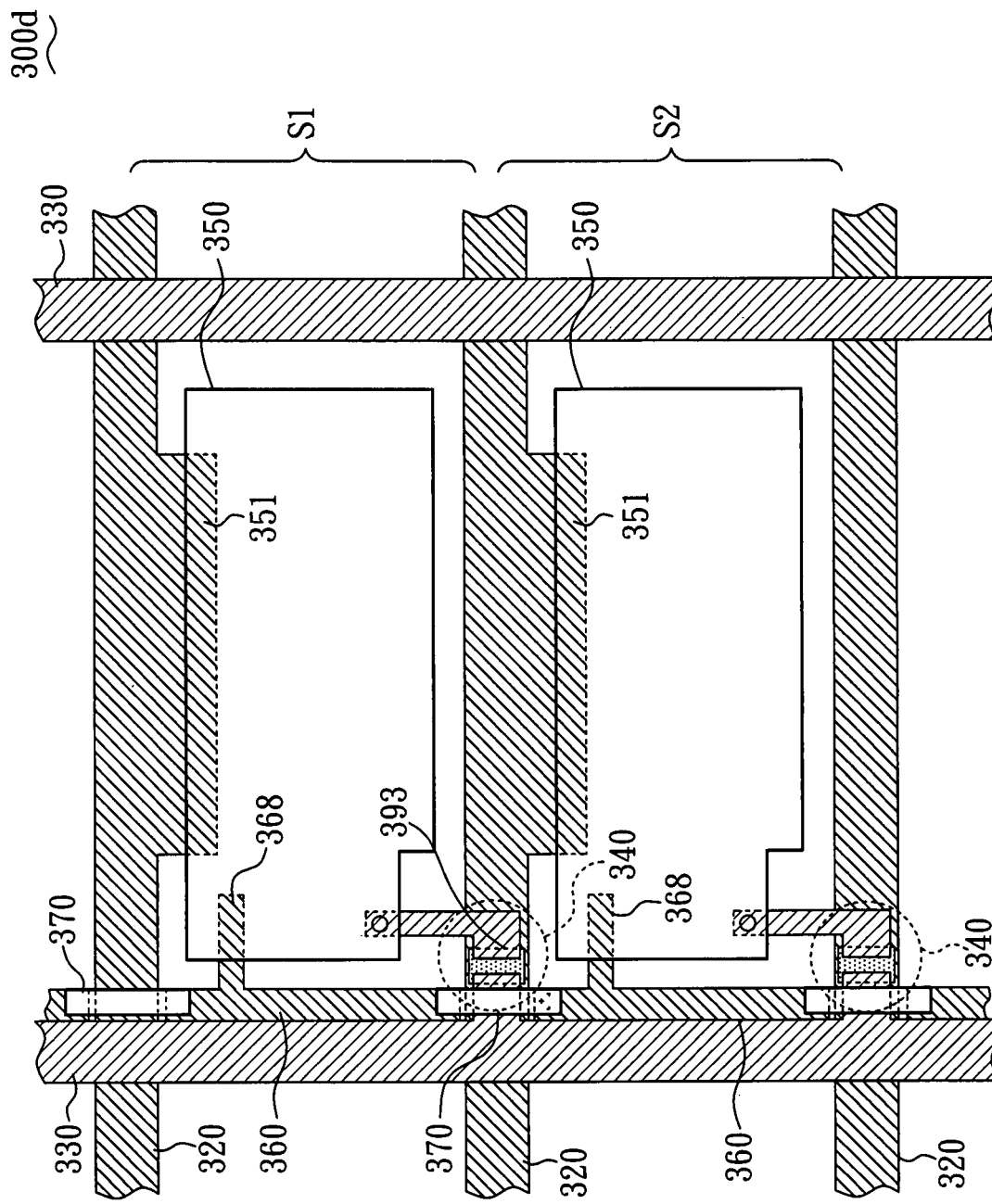
FIG. 5C is a schematic view of another type of pixel array substrate according to the third preferred embodiment of this present invention.

FIG. 5C is a schematic view of another type of pixel array substrate according to the third preferred embodiment of this present invention. Referring to FIGS. 5A and 5C, the pixel array substrate 300d is similar to the pixel array substrate 300a (FIG. 5a). In this embodiment, the first patterned floating line 360 further comprises a second protruding portion 368 partially overlapped with the pixel electrode 350. Since the repairing method of the second protruding portion 368 is similar to the repairing method of the first protruding portion 366 shown in FIG. 5B, one skilled in the art of the invention field can be easy to operate it.

Further, in this present invention the first protruding portion 366 or the second protruding portion 368 is preferably used to repair the broken pixel field, but it is not limited thereto.

In addition, this present invention not only can repair the broken data line, but also can repair the scan line. Another embodiment will describe a repairing method of scan line thereinafter.

The Fourth Embodiment

Figure 6:
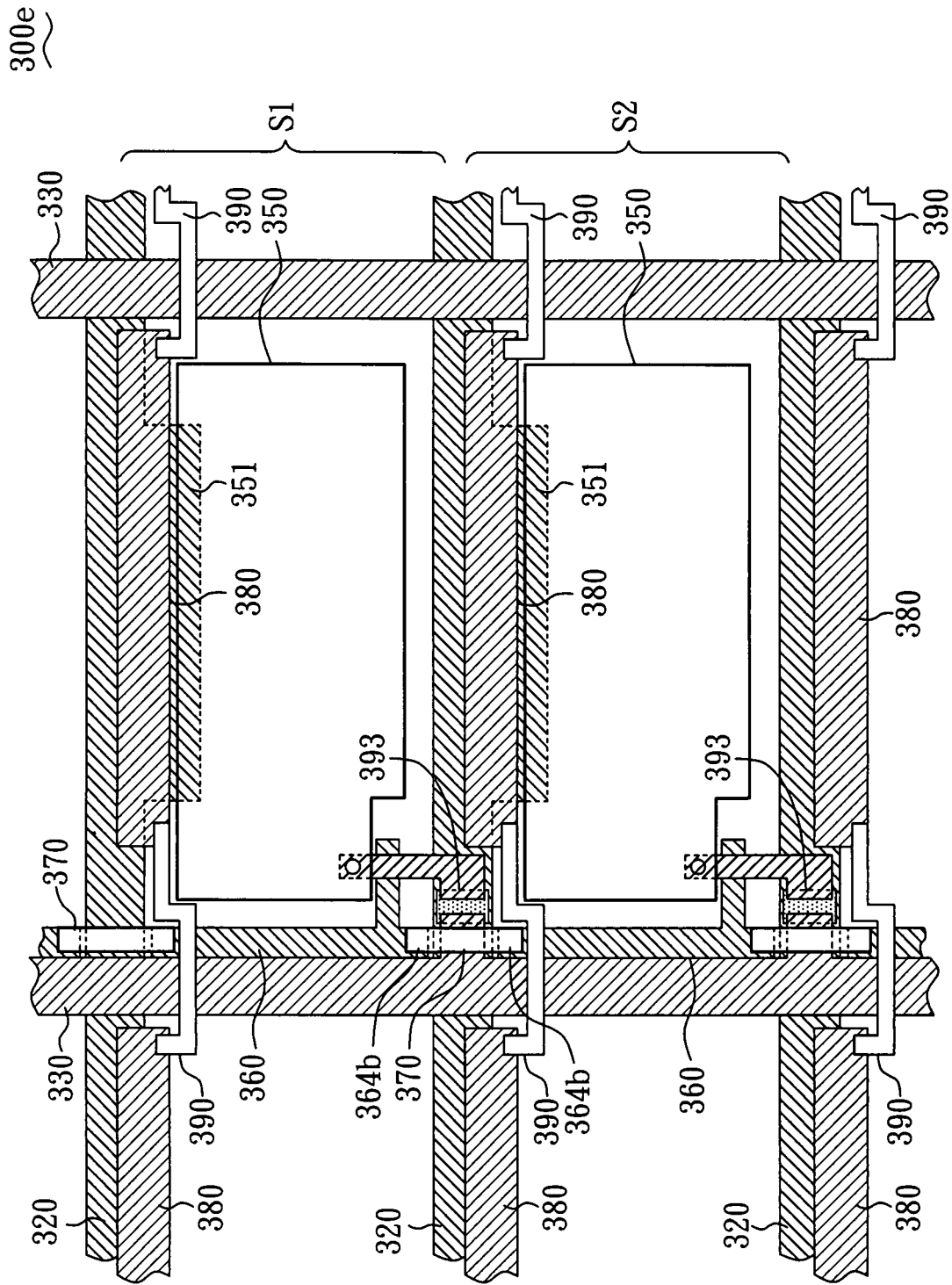
FIG. 6 is a schematic view of the pixel array substrate according to the fourth preferred embodiment of this present invention.

FIG. 6 is a schematic view of the pixel array substrate 300e according to the fourth preferred embodiment of this present invention. Referring to FIG. 6 the pixel array substrate 300e is similar to the pixel array substrate 300a (FIG. 3A). In this embodiment, the pixel array substrate 300e further comprises a plurality of second patterned floating lines 380 and a plurality of second patterned connecting wires 390 disposed on the substrate 310. In this embodiment, each of the second patterned floating lines 380 is partially overlapped with each corresponding scan line 320, and each of the second patterned connecting wires 390 crosses the data lines 330 and is partially overlapped with the second patterned floating line 380 disposed on the two sides of the data line 320. The second patterned floating line 380 may be disposed in parallel to the data lines 320.

In this embodiment, the second patterned floating line 360 and the data line 320 are disposed at the same layer, and the second patterned connecting wire 390 and the pixel electrode 350 are disposed at the same layer. Each isolated second patterned floating line can be welded by using laser welding process for repairing the data line 330. Since the repairing method of this embodiment is similar to the aforementioned embodiments, it's not repeated herein.

Further, although the pixel array substrate 300e comprises the first patterned floating line 360, the second patterned floating line 380, the first patterned connecting wire 370 and the second patterned connecting wire 390 for repairing the scan line 320 and the data line 330, this present invention also could only comprise the second patterned floating line 380 and the second patterned connecting wire 390 to repair the scan line 320.

Further, the pixel array substrate 300e also comprises a plurality of contact window (not shown in figure) disposed on the substrate 310, wherein each of the contact windows is electrically connected to the second patterned floating line 380 and the second patterned connecting wire 390.

In addition, the first patterned floating line 360 and the second patterned floating line 380 respectively crosses the data line 330 and the scan line 320 through the first patterned connecting wire 370 and the second patterned connecting wire 390. Due to the first patterned connecting wire 370 and the second patterned connecting wire 390 are disposed at the same layer in this embodiment, and another embodiment illustrating the first patterned connecting wire 370 and the second patterned connecting wire 390 being integrated will be described thereinafter.

Figure 7:
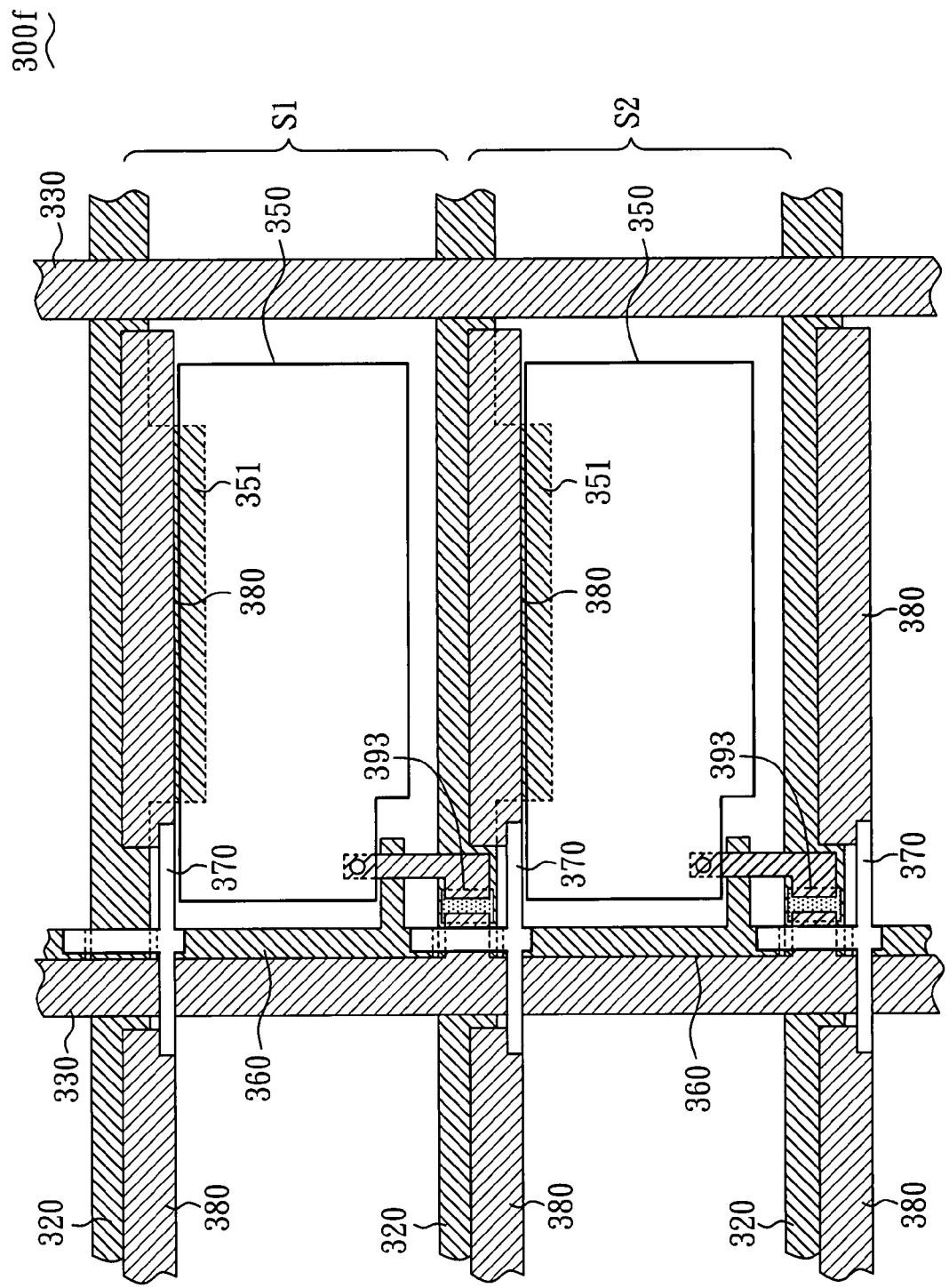
FIG. 7 is a schematic view of the pixel array substrate according to the fifth preferred embodiment of this present invention.

FIG. 7 is a schematic view of the pixel array substrate 300f according to the fifth preferred embodiment of this present invention. Referring to FIG. 7, the pixel array substrate 300f is similar to the pixel array substrate 300e (FIG. 6). In this embodiment, the first patterned connecting wire 370 crosses the scan lines 320 and the data line 330 and is partially overlapped with the first patterned floating line 360 disposed on the two sides of the scan line 320 and the second patterned floating line 380 is disposed on the two sides of the data line 330.

When the scan line 320 is broken, the second patterned floating line 380 is welded to the first patterned connecting wire 370 by using laser welding process for repairing the broken scan line 320. Furthermore, when the data line 330 is broken, the first patterned floating line 360 is welded to the first patterned connecting wire 370 by using laser welding process for repairing the broken data line 330.

In addition, the first patterned floating line 360 of the fourth embodiment and the fifth embodiment respectively comprises the first protruding portion 366 and the second protruding portion 368 (as the FIGS. 5A and 5C) so as to repair the broken pixel field.

The Sixth Embodiment

Figure 8A:
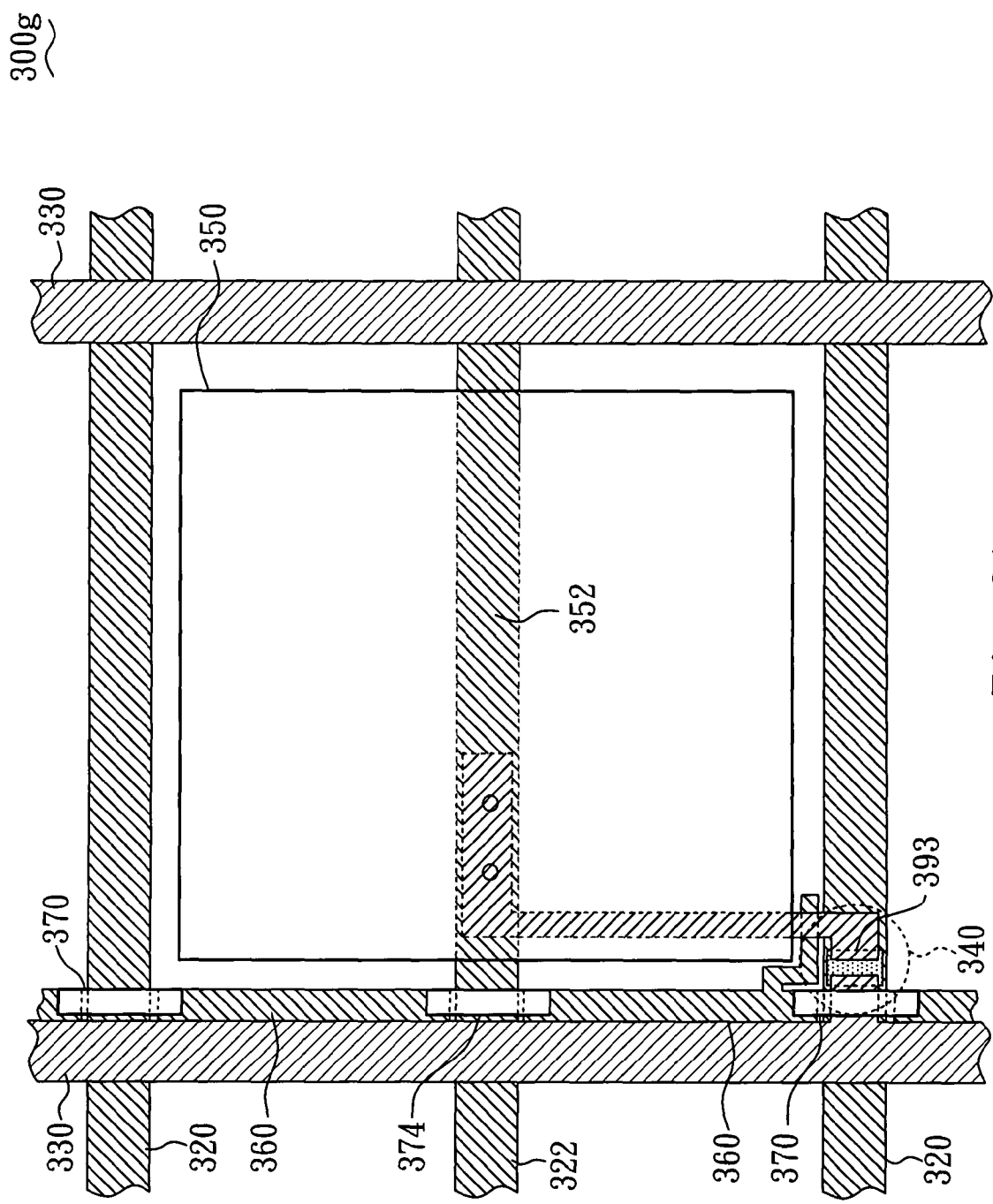
FIG. 8A is a schematic view of the pixel array substrate according to the sixth preferred embodiment of this present invention.

FIG. 8A is a schematic view of the pixel array substrate 300g according to the sixth preferred embodiment of this present invention. Referring to FIG. 8A, the pixel array substrate 300g is similar to the pixel array substrate 300a (FIG. 3A). In this embodiment, the pixel array substrate 300g further comprises a plurality of common lines 322 and a plurality of third patterned connecting wire 374 respectively disposed on the substrate 310. The common lines 322 and the scan lines 320 are disposed at the same layer, and each of the common lines 322 is parallel to the scan lines 320 and perpendicular to the data lines 330. In this embodiment, the common line 322 is partially overlaps with the pixel electrode 350 for forming an auxiliary capacitor 352. Each of the third patterned connecting wires 374 respectively crosses the common line 322 and is partially overlapped with the first patterned floating lines 360 disposed on the two side of the common line 322.

Figure 8B:
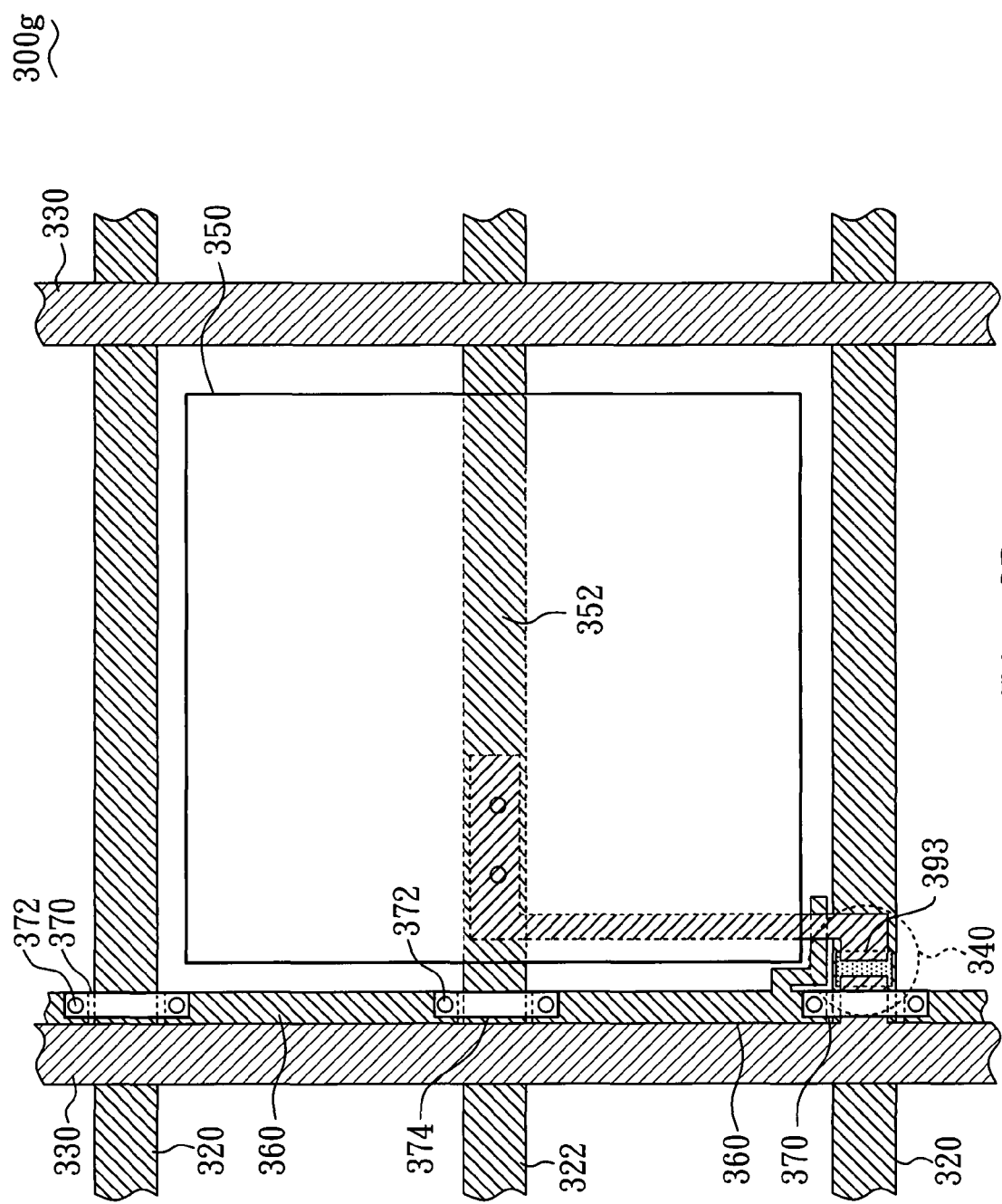
FIG. 8B is a schematic view of the pixel array substrate according to the sixth preferred embodiment of this present invention.

When the data line 330 is broken at the intersection of the data line 330 and the common line 322, the first patterned floating line 360 is welded to the third patterned connecting wire 374 by using laser welding process for repairing the broken data line 330. In addition, the pixel array substrate 300g further comprises a plurality of contact windows disposed on the substrate 310. Referring to FIG. 8B, some contact windows are electrically connected to the first patterned floating line 360 and the first patterned connecting wire 370, and some contact windows are electrically connected to the first patterned floating line 360 and the third patterned connecting wire 374. Therefore, the first patterned floating line 360, the first patterned connecting wire 370, and the third patterned connecting wire 374 are disposed at the same layer and respectively parallel to the data line 330.

As abovementioned, this present invention has the advantages described below:

When the data line is broken at the intersection of the data line and the scan line, the first patterned floating line is welded to the first patterned connecting wire to cross the scan line for repairing the broken data line. Since the first patterned floating line and the first patterned connecting wire are shorter than the conventional repair line and RC-delay can be prevented, so that the yield of the pixel array substrate can be increased.

In addition, when the active element is broken, the pixel electrode relative to the broken active element can transmit signals through the first protruding portion and the second protruding portion. The pixel field with the broken pixel electrode can substantially display the same color with the other adjacent pixel field so as to maintain a better quality of display device.

When the scan line is broken at the intersection of the data line and the scan line, the second patterned floating line is welded to the second patterned connecting wire to cross the data line for repairing the broken scan line. Therefore, this present invention can repair any broken line disposed on the substrate so as to increase the yield of the pixel array substrate.

Pixel array substrates in the preferred embodiments of the present application are used for LCD, for example.

Although the present invention has been explained in relation to its preferred embodiment, it is to be understood that many other possible modifications and variations can be made without departing from the scope of the invention as hereinafter claimed.

What is claimed is:

1. A pixel array substrate, comprising:
   a substrate;
   a plurality of scan lines disposed on the substrate, wherein the scan lines are parallel with each other;
   a plurality of first patterned floating lines disposed on the substrate and located between the scan lines;
   an insulation layer disposed on the substrate and covering the scan lines and the first patterned floating lines;
   a plurality of data lines disposed on the insulation layer, wherein said data lines are parallel with each other, each of the data lines crosses the plurality of scan lines and is partially overlapped with at least one of the first patterned floating lines, and each of the data lines is isolated from the first patterned floating lines when the data line is not broken, whereas the data line is correspondingly connected to the first patterned floating line through a welding portion when the data line is broken, wherein a break of the data line occurs over the scan line;
   a plurality of active elements formed on the substrate, wherein each of the active elements is electrically connected to each corresponding scan line and each corresponding data line;
   a plurality of pixel electrodes formed on the substrate, wherein each of the pixel electrodes is electrically connected to each corresponding active element; and
   a plurality of first patterned connecting wires, wherein each of the first patterned connecting wires crosses one of the scan lines and is overlapped with the first patterned floating lines disposed on the two sides of the scan line.

2. The pixel array substrate of claim 1, further comprising a plurality of contact windows disposed on the substrate, wherein the first patterned floating lines electrically connect to the first patterned connecting wires through the contact windows.

3. The pixel array substrate of claim 1, wherein each of the active elements comprises a drain, each of the first patterned floating lines comprises a first protruding portion, and each of the first protruding portions is partially overlapped with one of the drains.

4. The pixel array substrate of claim 1, wherein each of the first patterned floating lines comprises a second protruding portion, and each of the second protruding portions is partially overlapped with one of the pixel electrodes.

5. The pixel array substrate of claim 1, further comprising a plurality of second patterned floating lines disposed on the substrate, wherein each of the second patterned floating lines is partially overlapped with one of the scan lines.

6. The pixel array substrate of claim 5, wherein each of the first patterned connecting wires crosses one of the data lines and is partially overlapped with the second patterned floating lines disposed on the two sides of the data line.

7. The pixel array substrate of claim 6, further comprising a plurality of contact windows disposed on the substrate, wherein the second patterned floating lines electrically connect to the first patterned connecting wires through the contact windows.

8. The pixel array substrate of claim 5, further comprising a plurality of the second patterned connecting wires disposed on the substrate, wherein each of the second patterned connecting wires crosses one of the data lines and is partially overlapped with the second patterned floating lines disposed on the two sides of the data line.

9. The pixel array substrate of claim 8, further comprising a plurality of contact windows disposed on the substrate, wherein the second patterned floating lines electrically connect to the second patterned connecting wires through the contact windows.

10. The pixel array substrate of claim 1, further comprising a plurality of common lines disposed on the substrate, wherein the common lines are parallel with the scan lines and cross the data lines.

11. The pixel array substrate of claim 10, further comprising a plurality of third patterned connecting wires disposed on the substrate, wherein each of the third patterned connecting wires crosses one of the common lines and is partially overlapped with the first patterned floating lines disposed on the two sides of the data line.

12. The pixel array substrate of claim 10, further comprising a plurality of contact windows disposed on the substrate, wherein the first patterned floating lines electrically connect to the third patterned connecting wires through the contact windows.

13. The pixel array substrate of claim 1, wherein each of the scan lines is composed of aluminum, molybdenum, molybdenum nitride, titanium, titanium nitride, chromium, chromium nitride or a combination thereof.

14. The pixel array substrate of claim 1, wherein each of the data lines is composed of aluminum, molybdenum, molybdenum nitride, titanium, titanium nitride, chromium, chromium nitride or a combination thereof.

15. The pixel array substrate of claim 1, wherein each of the pixel electrodes is composed of Indium Tin Oxide or Indium Zinc Oxide.

16. The pixel array substrate of claim 1, wherein the break of the data line is overlapped with the scan line.

17. A pixel array substrate, comprising:
a substrate;
a plurality of scan lines disposed on the substrate;
a plurality of first patterned floating lines disposed on the substrate and located between the scan lines;
an insulation layer disposed on the substrate and covering the scan lines and the first patterned floating lines;
a plurality of data lines disposed on the insulation layer, wherein each of the data lines crosses the scan lines and partially overlaps with at least one of the first patterned floating lines, and each of the data lines is not connected to the first patterned floating lines when the data line is not broken, whereas the data line is correspondingly connected to the first patterned floating line through a welding portion when the data line is broken, wherein a break of the data line occurs over the scan line;
a plurality of active elements formed on the substrate, wherein each of the active elements is electrically connected to each corresponding scan line and each corresponding data line;
a plurality of pixel electrodes formed on the substrate, wherein each of the pixel electrodes is electrically connected to each corresponding active element; and
a plurality of first patterned connecting wires, wherein each of the first patterned connecting wires overlaps with the first patterned floating lines disposed on the two sides of the scan line.

18. The pixel array substrate of claim 17, further comprising a plurality of contact windows disposed on the substrate, wherein the first patterned floating lines electrically connect to the first patterned connecting wires through the contact windows.

19. The pixel array substrate of claim 17, wherein each of the active elements comprises a drain, each of the first patterned floating lines comprises a first protruding portion, and each of the first protruding portions partially overlaps with one of the drains.

20. The pixel array substrate of claim 17, wherein each of the first patterned floating lines comprises a second protruding portion partially overlapped with one of the pixel electrodes.

21. The pixel array substrate of claim 17, further comprising a plurality of second patterned floating lines disposed on the substrate, wherein each of the second patterned floating lines is partially overlapped with one of the scan lines.

22. The pixel array substrate of claim 21, wherein each of the first patterned connecting wires crosses one of the data lines and is partially overlapped with the second patterned floating lines disposed on the two sides of the data line.

23. The pixel array substrate of claim 22, further comprising a plurality of contact windows disposed on the substrate, wherein the second patterned floating lines electrically connect to the first patterned connecting wires through the contact windows.

24. The pixel array substrate of claim 21, further comprising a plurality of the second patterned connecting wires disposed on the substrate, wherein each of the second patterned connecting wires crosses one of the data lines and is partially overlapped with the second patterned floating lines disposed on the two sides of the data line.

25. The pixel array substrate of claim 24, further comprising a plurality of contact windows disposed on the substrate, wherein the second patterned floating lines electrically connect to the second patterned connecting wires through the contact windows.

26. The pixel array substrate of claim 17, further comprising a plurality of common lines disposed on the substrate, wherein the common lines are parallel with the scan lines and cross the data lines.

27. The pixel array substrate of claim 26, further comprising a plurality of third patterned connecting wires disposed on the substrate, wherein each of the third patterned connecting wires crosses one of the common lines and is partially overlapped with the first patterned floating lines disposed on the two sides of the data line.

28. The pixel array substrate of claim 26, further comprising a plurality of contact windows disposed on the substrate, wherein the first patterned floating lines electrically connect to the third patterned connecting wires through the contact windows.

29. The pixel array substrate of claim 17, wherein each of the scan lines is composed of aluminum, molybdenum, molybdenum nitride, titanium, titanium nitride, chromium, chromium nitride or a combination thereof.

30. The pixel array substrate of claim 17, wherein each of the data lines is composed of aluminum, molybdenum, molybdenum nitride, titanium, titanium nitride, chromium, chromium nitride or a combination thereof.

31. The pixel array substrate of claim 17, wherein each of the pixel electrodes is composed of Indium Tin Oxide or Indium Zinc Oxide.

32. The pixel array substrate of claim 17, wherein the break of the data line is overlapped with the scan line.

33. A pixel array substrate, comprising:
a substrate;
a plurality of scan lines disposed on the substrate, wherein the scan lines are parallel with each other;
a plurality of first patterned floating lines disposed on the substrate and located between the scan lines;
an insulation layer disposed on the substrate and covering the scan lines and the first patterned floating lines;
a plurality of data lines disposed on the insulation layer, wherein said data lines are parallel with each other, each of the data lines crosses the plurality of scan lines and is partially overlapped with at least one of the first patterned floating lines;
a plurality of active elements formed on the substrate, wherein each of the active elements is electrically connected to each corresponding scan line and each corresponding data line;
a plurality of pixel electrodes formed on the substrate, wherein each of the pixel electrodes is electrically connected to each corresponding active element; and
a plurality of first patterned connecting wires, wherein each of the first patterned connecting wires crosses one of the scan lines and is overlapped with the first patterned floating lines disposed on the two sides of the scan line, and one of the data lines is broken and is corresponding connected to the first patterned floating line via the corresponding first patterned connecting wire which is overlapped with the corresponding scan line.

34. A pixel array substrate, comprising:
a substrate;
a plurality of scan lines disposed on the substrate, wherein the scan lines are parallel with each other;
a plurality of first patterned floating lines disposed on the substrate;
an insulation layer disposed on the substrate and covering the scan lines and the first patterned floating lines;
a plurality of data lines disposed on the insulation layer, wherein said data lines are parallel with each other, each of the data lines crosses the plurality of scan lines and is partially overlapped with at least one of the first patterned floating lines;
a plurality of active elements formed on the substrate, wherein each of the active elements is electrically connected to each corresponding scan line and each corresponding data line;
a plurality of pixel electrodes formed on the substrate, wherein each of the pixel electrodes is electrically connected to each corresponding active element; and
a plurality of first patterned connecting wires, wherein one of the first patterned connecting wires crosses corresponding one of the scan lines and is overlapped with two adjacent first patterned floating lines which are substantially disposed on the two sides of the corresponding one of the scan lines.

\* \* \* \* \*